US00RE36960E

United States Patent [19]

Boswell et al.

[11] E Patent Number: Re. 36,960

[45] Reissued Date of Patent: Nov. 21, 2000

[54] MUFFLE CONVECTION BRAZING/ ANNEALING SYSTEM

[75] Inventors: Jeffrey W. Boswell, Cochranton; Michael A. Schmidt, Meadville, both of Pa.

[73] Assignee: Seco/Warwick Corporation, Meadville, Pa.

[21] Appl. No.: 09/233,194

[22] Filed: Jan. 20, 1999

Related U.S. Patent Documents

Reissue of:

[64] Patent No.: 5,271,545
Issued: Dec. 21, 1993
Appl. No.: 08/040,641
Filed: Mar. 31, 1993

[51] Int. Cl.[7] ..... B23K 1/00; B23K 5/00

[52] U.S. Cl. ..... 228/43; 228/471; 228/183; 432/152

[58] Field of Search ..... 228/43, 47.1, 183, 228/227; 432/144, 145, 152, 212

[56] References Cited

U.S. PATENT DOCUMENTS

| | | | |
|---|---|---|---|
| 2,713,480 | 7/1955 | Ruckstahl | 432/152 |
| 3,880,578 | 4/1975 | Chartet | 432/243 |
| 3,982,887 | 9/1976 | Kendziora et al. | 432/152 |
| 4,482,314 | 11/1984 | Giese | 432/11 |
| 4,891,008 | 1/1990 | Hemsath | 432/148 |
| 4,906,182 | 3/1990 | Moller | 432/152 |
| 5,069,380 | 12/1991 | Deambrosio | 228/43 |
| 5,195,673 | 3/1993 | Irish et al. | 228/183 |
| 5,271,545 | 12/1993 | Boswell et al. | 228/43 |
| 5,328,084 | 7/1994 | Halstead et al. | 228/18 |

OTHER PUBLICATIONS

Drawing of Seco/Warwick's brazing furnace, Feb. 1992.

Boswell et al., "Controlled Atmosphere Brazing of Aluminum Automotive Heat Exchangers", 1992.

Seco/Warwick brochure entitled "Controlled Atmosphere Aluminum Brazing Systems",1996.

*Primary Examiner*—Patrick Ryan
*Assistant Examiner*—Lynn Edmondson
*Attorney, Agent, or Firm*—Oliff & Berridge, PLC

[57] ABSTRACT

A convection muffle furnace for brazing and/or annealing a workpiece includes a muffle having towers formed integrally therewith and being mounted movable relative to a top wall of a furnace. Circulation fans are mounted in the towers so as to move along with the muffle during its expansion and contraction for producing forced convection heat transfer.

21 Claims, 2 Drawing Sheets

MUFFLE CONVECTION BRAZING/ ANNEALING SYSTEM

Matter enclosed in heavy brackets [ ] appears in the original patent but forms no part of this reissue specification; matter printed in italics indicates the additions made by reissue.

BACKGROUND OF THE INVENTION

This invention relates generally to heat-treating furnaces used for brazing and/or annealing of workpieces. More particularly, it relates to an improved method and apparatus for brazing and annealing of a workpiece which includes a furnace having a muffle formed therein and circulation fans disposed in towers which are an integral part of the muffle so as to produce forced convection heat transfer.

As is generally well-known in the art of heat-treating, brazing and annealing require a close tolerance on the temperature control in order to achieve a desired temperature profile or to maintain temperature uniformity within a workpiece. Convection heat transfer has been found to provide faster heating or cooling of the workpiece on a more uniform basis. In such convection heat transfer, the hot gases are typically directed at the workpiece by means of jets or fans, with the fans being the more common means to impart velocity to the gases.

Further, the brazing and annealing processes may also have to be carried out in a special or protective-treatment atmosphere, such as nitrogen or an exothermic gas, which creates conditions that prevent oxidation of the workpiece or imparts other desirable characteristics such as the reduction of oxides. When a combination of rapid heat transfer and a controlled atmosphere has been required, the conventional practice has been to introduce the desired atmosphere into a sealed furnace. For furnaces of the so-called [type] continuous operation type, these furnaces having an inlet and an outlet are provided with baffles so as to reduce loss of the atmosphere. To protect the atmosphere from contamination due to leakage, these furnaces are heated by gas-fired radiant tube burners or electrically-heated elements such as electrical resistors.

In this manner, such convective heat transfer is attained by means of the fans or jets being mounted in and extending through the side walls or the roof of the furnace. These controlled-atmosphere furnaces generally perform adequately if the furnace insulation does not react with the atmosphere, permit loss of the atmosphere, or cause product/process contamination by deposition of dust resulting from degradation of the insulation. Further, in cases when purity of the atmosphere is critical, the furnace system must be purged for extended periods of time so as to remove the contaminating gases from the voids in the insulation.

In order to prevent the contamination problem as described above, there has been used in conventional practice a gas-impervious metallic inner liner to isolate the workpiece in the controlled-atmosphere form the insulation. Such a prior art convection braze furnace having a lined atmosphere for brazing aluminum heat exchanges is illustrated and described in U.S. Pat. No. 5,147,083 to Gary A. Halstead et al., issued on Sep. 15, 1992. The use of the inner liner suffers from the disadvantage in that it is required to be rigidly positioned with respect to fans, doors, and heating/cooling devices since these items are mounted and sealed to the furnace outer shell.

Another drawback lies in the fact that the need for rigid mounting of the inner liner imposes stresses thereon as a result of differential thermal expansion and contraction between the inner liner and the furnace casing. While various mechanisms have been used heretofore so as to absorb or counteract the stresses due to the differential expansion and contraction, these stresses eventually lead to destruction of the integrity of the liner due to the temperatures normally encountered in the brazing and annealing processes. This problem becomes even more complex because replacement of the liner then becomes necessary which is a very expensive task since the furnace must essentially be completely disassembled for removal of the existing liner and building of a new one in its place.

Moreover, another difficulty results from the necessity of supplying heating or cooling through the radiant tubes which isolates a gaseous media from the furnace atmosphere. This results in low heat transfer rates from these items to the recirculating atmosphere. Also, radiant tubes are temperature limited by the materials of construction that can be used, thereby further reducing heating capacity. Leakage of gases through the radiant tubes and leakage around penetrations are also additional sources of atmosphere contamination.

While there has also been implemented in the prior art muffle-type furnaces in order to overcome the disadvantages of the traditional lined controlled-atmosphere furnaces, these muffle-type furnaces are still not free from all problems. In particular, since the muffle has the capability of being freely movable with the thermal forces there has not been heretofore developed a suitable means for equipping a muffle-type furnace with recirculating fans for imparting convection heat transfer to the workpiece within the muffle so as to produce increased heating rates as well as high thermal efficiencies.

Accordingly, this invention has been conceived and developed to provide a solution to this long-felt need in the industry by mounting circulation fans in towers which are an integral part of the muffle and thus can expand and contract along with the muffle. The present invention represents a significant improvement over the convection braze furnace in the aforementioned '083 patent, which is hereby incorporated by reference.

SUMMARY OF THE INVENTION

Accordingly, it is a general object of the present invention to provide an improved muffle convection brazing/annealing furnace which is relative simple and economical to manufacture and assemble, but yet overcomes the disadvantages of the prior art furnaces.

It is an object of the present invention to provide an improved muffle convection brazing/annealing furnace which includes a muffle having towers formed integrally therewith and being mounted movable relative to the top wall of the furnace, and circulation fans disposed in the towers so as to produce forced convection heat transfer.

In the preferred embodiment of the present invention, there is provided an improved convection muffle furnace for brazing and/or annealing a workpiece which includes a heating chamber formed by a bottom wall, a pair of side walls, a front wall, a rear wall and a top wall. There is provided a muffle which is formed by side walls, a floor and a roof. The side walls of the muffle are disposed in a parallel, spaced-apart relationship to the side walls of the heating chamber and extend from the front wall of the heating chamber to the rear wall thereof. The muffle is divided into a plurality of successive individual convection brazing zones which are separated from each other.

A plurality of towers are provided, each being formed integrally with the roof of the muffle in each brazing zone and are mounted movably relative to the top wall of the heating chamber A plurality of fans are provided, each being mounted and sealed in a corresponding one of the plurality of towers for creating an atmosphere convection current in each of the brazing zones. Direct-fired burners are provided for heating the exterior of the muffle so as to increase the temperature of the atmosphere convection current. As a result, the plurality of fans in the towers are movable along with the muffle during its expansion and contraction so as to provide increased heating rates and high thermal efficiencies.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
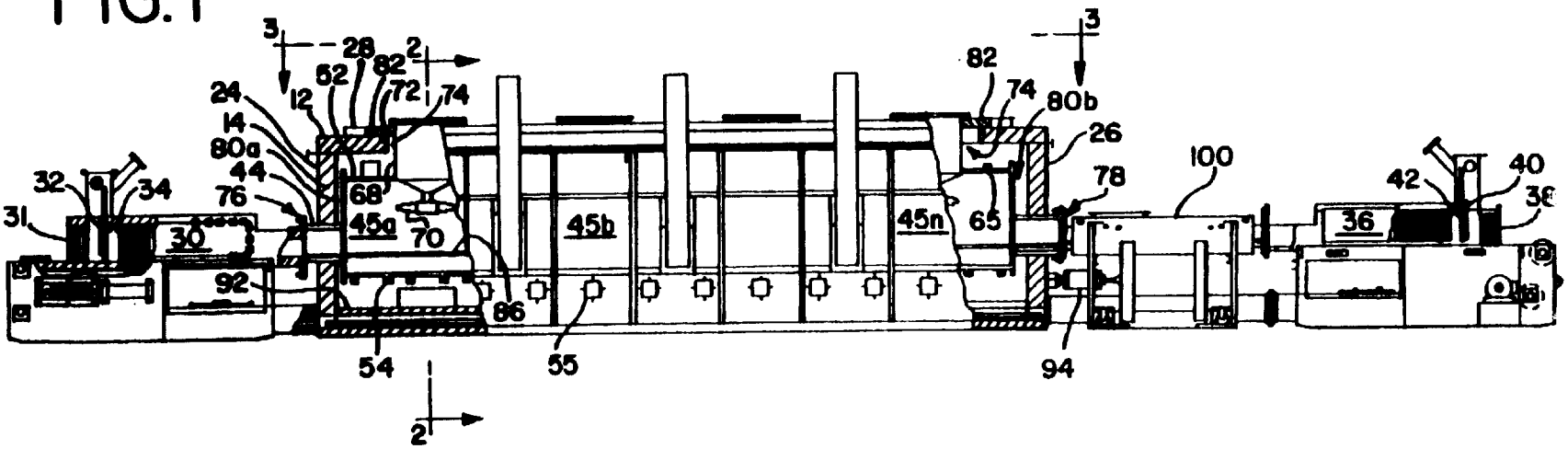
FIG. 1 is a side elevational view, partly fragmentary, of a muffle convection brazing/annealing system, constructed in accordance with the principles of the present invention.
Figure 3:
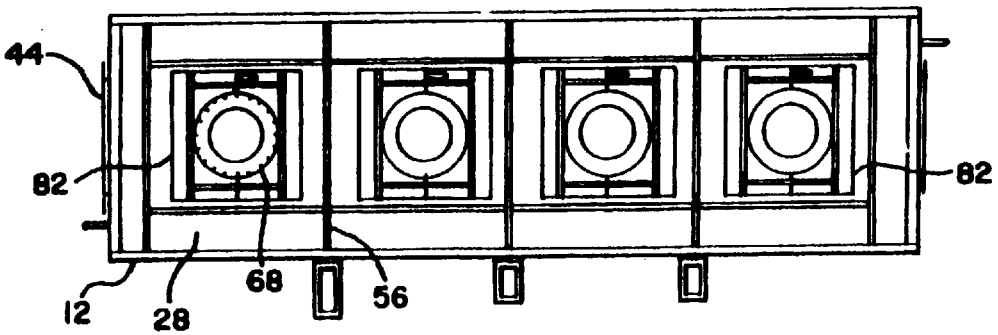
FIG. 3 is a top plan view of the muffle convection system, taken along the lines 3—3 of FIG. 2.
Figure 2:
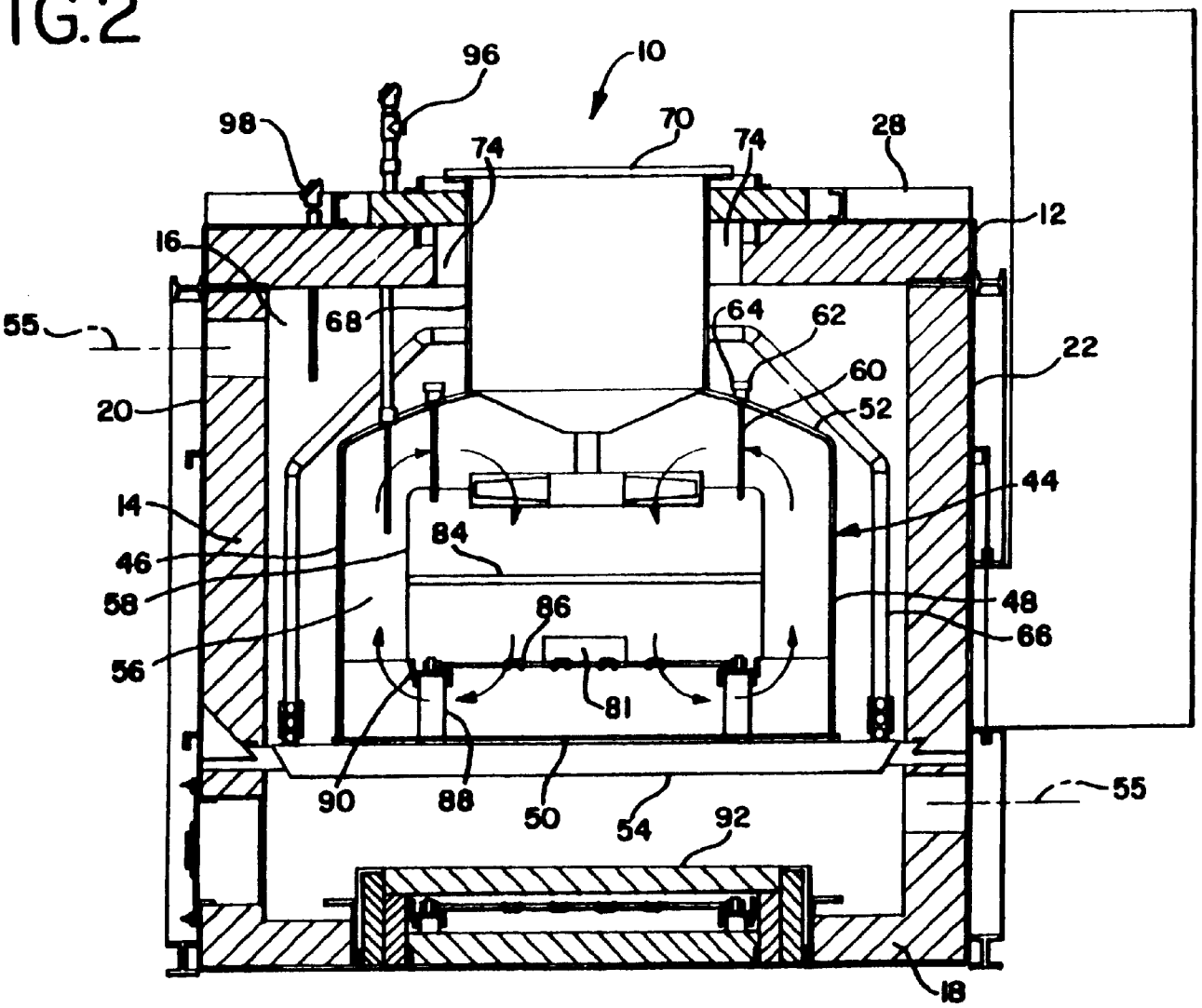
FIG. 2 is a cross-sectional view taken along the lines 2—2 of FIG. 1.

Referring now in detail to the drawings, there is illustrated in FIGS. 1 through 3 an improved muffle convection brazing/annealing furnace 10 which is constructed in accordance with the principles of the present invention. The muffle convection furnace is formed of a sheet metal outer shell 12 which is lined with a layer 14 of insulating refractory material on its interior to define an insulated heating space or chamber 16. The muffle furnace includes a bottom wall 18, a pair of side walls 20 and 22, a front wall 24, a rear wall 26 and a top wall or roof 28. Extending longitudinally and upstream of the front wall 24, there is provided an entrance chamber 30 having atmospheric curtains 31 formed therein and a front door 32 for covering an entrance opening 34. Similarly, there is provided an exit chamber 36 extending longitudinally and downstream of the rear wall 26 which is formed with atmospheric curtains 38 and a rear door 40 for covering an exit opening 42. The front and rear doors 32, 40 are adapted to slide in a vertical plane under control of elevating mechanisms (not shown) which are well known in the art.

There is provided a muffle 44 formed by side walls 46 and 48, a floor 50, and an arch-shaped roof 52 so as to define a D-shaped muffle which is surrounded by the heating chamber 16 through which heated gases may rise to heat the exterior of the muffle. However, it should be apparent to those skilled in the art that the muffle 44 may be formed of any number of shapes other than the D-shaped muffle as illustrated. The muffle side walls 46 and 48 are arranged to extend vertically and are disposed in a parallel, spaced-apart relationship to the furnace side walls 20 and 22, respectively. Further, the muffle 44 extends longitudinally between the front wall 24 and the rear wall 26 of the furnace. The muffle floor 50 is supported at predetermined intervals along its length by muffle supports such as by means of beams 54. The beams extend through the refractory material 14 and are fixedly attached to the outer shell 12 of the furnace, as is shown in FIG. 2.

A plurality of direct-fired gas burners 55 extends through the upper and lower parts of the side walls 46 and 48 of the furnace so as to directly heat the exterior of the muffle 44. It will be noted that the radiant tubes of the prior art braze furnace in the '083 patent are not used in the present invention. As is well known, radiant tubes are heated by hot gases from a burner or other heat sources flowing through the inside of the tubes and thus loose heat from their exterior surfaces by radiation and convection heat transfer. For a fixed set of condition, the ability of radiant tubes to receive and transfer heat becomes dependent upon the surface area available for heat transfer. The length and number of radiant tubes that can be installed in a furnace is limited by physical and technical constraints which fix heat transfer areas. Under the constraints imposed for the atmosphere furnaces, it can be established that the radiant tubes could have a thermal efficiency of no more than 50%. In other words, one-half of the heat input is lost in the flue gases. On the other hand, the direct-fire convection muffle furnace of the present invention can have a thermal efficiency of 68%.

The heating chamber 16 within the outer shell 12 of the furnace surrounds the muffle 44. The muffle is divided into a plurality of individual convection brazing zones 45*a*, 45*b*, . . . 45*n* which are generally separated from each other by zone divider plates 56. The plates 56 are rigidly attached to the ends of internal barriers or baffles forming a plenum 58. The barriers of the plenum 58 are suspended by plenum support rods 60. There are provided support access ports 62 for installation of the support rods 60 to the muffle 44 and for permitting access for subsequent adjustment thereof. In order to eliminate the entry of the external atmosphere, the ends of the access ports 62 are closed by means of threaded caps 64 so as to maintain a gas-tight seal.

Process gas, such as nitrogen or an exothermic gas, is injected under pressure into each of the plurality of convection brazing zones 45*a* through 45*n* by connection inlet means 65 operatively coupled (i.e., welded) to the muffle 44. The process gas is fed through a heating annulus 66 disposed between the muffle side walls 46, 48 and the respective furnace side walls 20, 22 so as to preheat the same before use. Flexible connections (not shown) are mounted externally to the furnace for permitting the heating annulus 66 to move with the muffle 44. For a continuous operation, the process gas is continuously supplied to the muffle so as to pressurize the brazing zones and to replace any gas which is lost due to escape through the atmospheric curtains 31, 38 and associated front and rear doors 32, 40.

Since the muffle 44 is a continuous gas-impervious member, it serves to protect the workpieces to be heat-treated from contamination. The muffle is advantageous from the standpoint that it can be directly heated or cooled and can be easily removed from the furnace for repair or replacement. Further, the muffle has another advantage in that it is free to expand, thereby virtually eliminating differential thermal expansion and contraction problems. As a result, the muffle can be built from a variety of different materials which are of a heavier gauge than those traditionally used in forming the rigid inner liner of the prior art braze furnaces. Therefore, by using the materials of heavier gauges, the useful life of the furnace system can be readily extended.

It is well known that forced convection heat transfer is a much more efficient method of heating workpieces than either radiant heat transfer or natural convection heat transfer. However, prior to the present invention, there was no known means of utilizing fans internally to the muffle so as to impart such forced convective heat transfer since the muffle moved freely with thermal forces. The subject invention overcomes the deficiencies in the prior art braze furnaces by providing a muffle tower 68 which is formed as an integral part of the muffle in each brazing zone and mounting a circulating fan 70 in the muffle tower 68 so that it is free to move as the muffle 44 expands and contracts. This combination of direct heating and forced convective heat transfer has increased significantly the heating rates and the thermal efficiencies over the conventional indirect-fired (radiant tube) atmosphere furnaces with convective heat transfer.

As can be seen, each of the muffle towers 68 in the convective brazing zones 45*a*–45*n* is formed integrally with the arch-shaped roof 52 of the muffle and extends vertically through aligned openings 72 disposed in the furnace roof 28. The diameter of the openings 72 is somewhat larger than the diameter of the muffle tower 68 so as to provide a space or area 74 on each side thereof. As a result, the muffle tower 68 is permitted to move laterally relative to the outer shell 12 of the furnace for absorbing longitudinal expansion and contraction of the muffle without contaminating the controlled atmosphere in the convective brazing zones. It will be noted that the muffle 44 is rigidly fixed in its one end 76 adjacent the entrance chamber 30 and is suspended to freely move at its other rend 78 adjacent the exit chamber 36. Further, there are provided spaces or areas 80*a* and 80*b* adjacent the respective front and rear walls 24, 26 of the furnace so as to define expansion zones to accommodate for the longitudinal expansion and contraction of the muffle.

An insulating sliding seal 82 is used to surround the upper section of the tower 68 and is disposed on top of the furnace roof 28 so as to cover the opening 72, thereby producing a gas-tight seal. Deep-well plug fans 70 are mounted and sealed in each of the respective towers 68 associated with the brazing zones 45*a*–45*n* for convectively circulating the processed gas through the plenum 58 and the workpiece 81, shown in phantom in FIG. 2, to be heat-treated. The fans 70 serve to create an atmospheric convection current in the brazing zones 45*a*–45*n*. Thus, as illustrated in FIG. 2 by the convection current arrows, the process gas is discharged downwardly from the fan at the top of the internal baffle through the plenum 58, then upwardly on each interior side of the muffle 44, and back to the fan 70.

Fixed louvers 84 are disposed within the plenum 58 for uniformly directing the process gas perpendicularly and downwardly towards the top of the workpiece 81. The louvers are attached to the interior of the side barriers or baffles forming the plenum. The process gas passing through the plenum is heated (or cooled) when it comes in contact with the interior walls of the muffle. The workpiece 81 to be heat-treated is carried by a conveyor 86 for successively transporting it through the muffle. The conveyor 86 is supported b piers 88 which are mounted permanently to the inner surface of the muffle floor 50. There are provided guides 90 attached to the piers 88 for insuring proper tracking of the conveyor 86 as it is driven through the furnace. The conveyor 86 is also movable through an insulated conveyor return or trough 92 for returning the same to the front of the furnace. Some preheating of the conveyor 86 is obtained by the normal heat loss through the insulation thereof.

In order to impart rigidity to the muffle 44, muffle side walls 46, 48 and the arch-shaped roof 52 are preferably corrugated circumferentially. Further, the muffle floor 50 may be corrugated in the longitudinal direction. A pneumatic cylinder 94 is disposed at the rear wall 26 of the furnace so as to maintain a constant tension on the muffle 44. This serves to overcome the frictional forces that could prevent the muffle from expanding lengthwise uniformly, thereby causing deformation of the muffle.

First thermocouples 96 extend through the outer shell 12, the layer 14 of refractory material, and into the heating chamber 16 and is used to send signals to instruments that vary the firing of the burners 55 (i.e., turning them on, more or less) so as to control the temperature in each of the convective brazing zones 45*a*–45*n*. The first thermocouples 96 are mounted through external connection pipes (not shown) which are welded to the muffle 44 so as to form a gas-tight seal and are operatively attached to the sliding seals 82 so that they are allowed to move in conjunction with the muffle. Second thermocouples 98 extends through the outer shell 12, the layer 14 of the refractory material and into the heating annulus 66 and is used to detect excess temperature conditions caused by the first thermocouples or other mechanical failure to thus shut off the burners 55.

In operation, the furnace is initially turned on and is preheated to a predetermined operating temperature. When the process gas introduced into the muffle 44 has reached the desired value, the workpieces 81 such as prefluxed aluminum heat exchangers are loaded onto the conveyor 86. Thereafter, the workpieces enter via the front door 32 into the entrance chamber 30 and are passed through the atmospheric curtains 31 into the first convective brazing zone 45*a* of the furnace. As the workpieces pass through the atmospheric curtains, they are exposed to a stream of exiting process gas which removes trapped air therefrom in order to prevent oxygen contamination within the brazing zone.

As the workpieces pass through each successive brazing zone, the hot gases are driven around and through the workpiece at a very high velocity by the circulating fans 70. The workpieces absorb the heat from the hot gas and lowers the temperature thereof. This lower temperature is detected by the first thermocouples 96 which cause an increase in the firing rate of the burners 55 so as to return the temperature in the heating chamber 16 to its preset value. As the burner fires, the walls of the muffle 44 become hotter. As a result, the heat from the walls is transferred to the process gas by the scrubbing action due to the high velocity circulating current around the inner walls of the muffle 44.

This heating process is continued as the workpieces pass through the successive convective brazing zones until the workpieces [reaches] *reach* the proper temperature. [As] *At* this time, the workpieces are allowed to "soak" so as to insure uniform temperatures throughout the workpieces for melting the braze material. From the last convective brazing zone (i.e., zone 45*n*), the workpieces are transported to a cooling zone 100 in which it is cooled so as to solidify the brazed material. Upon leaving the cooling zone 100, the workpieces are conveyed to the exit chamber 36 through the atmospheric curtains 38 and then out the rear door 40. A continuous flow of the process gas is supplied in the exit chamber 36 so as to prevent air infiltration, thereby avoiding contamination of the controlled atmosphere in the brazing zone.

While conventional muffle furnaces could be used to braze aluminum sheet exchangers by heating them by natural convection and radiation, the length of these furnaces would, however, be required to be extremely long so as to prevent localized temperatures from melting the aluminum heat exchangers. This is because certain braze materials for aluminum have a melting point which is very close (within 100° F.) to the melting point of aluminum. The forced convection muffle furnace 10 of the present invention produces temperature uniformity throughout the convective brazing zones so as to effect a substantially uniform heating rate. Further, since the present muffle furnace is direct-fired, there is less fuel cost than the prior art furnaces utilizing radiant tubes. By comparing the tests performed on the operation of the direct-fired forced convection muffle furnace 10, it was found to be approximately 30 to 40 percent more thermally efficient than the radiant tube heated atmospheric furnaces of the prior art.

From the foregoing detailed description, it can thus be seen that the present invention provides an improved convection muffle furnace for brazing and/or annealing a workpiece which includes a muffle having towers formed integrally therewith and being mounted movable relative to the top wall of the furnace. Circulation fans disposed in the towers so as to move along with the muffle during its expansion and contraction thereby producing forced convection heat transfer.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A convection muffle furnace for brazing and/or annealing a workpiece comprising:

a heating chamber formed by a bottom wall, a pair of side walls, a front wall, a rear wall and a top wall;

a *D-shaped* muffle formed by side walls, a floor and a roof;

the side walls of said muffle being disposed in a parallel, spaced-apart relationship to said side walls of said heating chamber and extending from the front wall of said heating chamber to the rear wall thereof;

said muffle being divided into a plurality of successive individual convection brazing zones which are spaced apart from each other;

a plurality of towers each being formed integrally with the roof of said muffle in each brazing zone and being mounted movably relative to the top wall of said heating chamber;

a plurality of fans each being mounted and sealed in a corresponding one of said plurality of towers for creating an atmospheric convection current in each of said brazing zones; and direct-fired burners for heating the exterior of said muffle so as to increase the temperature of the atmospheric convection current;

whereby said plurality of fans in said plurality of towers are movable along with said muffle during its expansion and contraction so as to provide increased heating rates and high thermal efficiencies.

2. A convection muffle furnace as claimed in claim 1, wherein said muffle has its one end adjacent said front wall of the heating chamber being fixed and has its other end adjacent said rear wall thereof being freely movable.

3. A convection muffle furnace as claimed in claim 1, further comprising expansion zone means disposed adjacent the front and rear walls of said heating chamber for permitting longitudinal expansion and contraction of said muffle.

4. A convection muffle furnace as claimed in claim 1, wherein said side walls, floor and roof of said muffle are corrugated so as to impart rigidity thereto.

5. A convection muffle furnace as claimed in claim 1, further comprising expansion cylinder means disposed adjacent the rear wall of the heating chamber so as to maintain a constant tension on said muffle and thereby preventing its deformation.

6. A convection muffle furnace as claimed in claim 1, wherein said towers are mounted in openings formed in said top wall of the heating chamber, said openings being somewhat larger than the diameter of said towers to define spaces which permits lateral movement of said towers relative to said top wall for absorbing expansion and contraction of said muffle.

7. A convection muffle furnace as claimed in claim 6, further comprising sliding seal means disposed over said openings in said top wall to provide a gas-tight seal between said top wall and said towers.

8. A convection muffle furnace as claimed in claim 1, further comprising an entrance chamber disposed upstream of said front wall of the heating chamber for preventing contamination of the atmosphere in said brazing zone as workpieces to be heat-treated are supplied.

9. A convection muffle furnace as claimed in claim 8, further comprising an exit chamber disposed downstream of said rear wall of the heating chamber for preventing contamination of the atmosphere in said brazing zone as the workpieces that have been heat-treated are removed.

10. A convection muffle furnace for brazing and/or annealing a workpiece comprising:

a heating chamber formed by a bottom wall, a pair of side walls, a front wall, *a* rear wall and a top wall;

muffle means disposed inside of said heating chamber and extending longitudinally from the front wall of said heating chamber to the rear wall thereof*, said muffle means comprising a D-shaped muffle having planar side walls parallel to the side walls of the heating chamber, a planar floor connected to the planar side walls and a dome-shaped roof positioned above and connected to the planar side walls;* said muffle means including tower means formed integrally therewith and being mounted movably relative to the top wall of said heating chamber;

circulating means being mounted and sealed in said tower means for creating an atmospheric convection current; and direct-fired burners for heating the exterior of said muffle means so as to increase the temperature of the atmospheric convection current, whereby said circulating means in said tower means are movable along with said muffle means during its expansion and contraction so as to provide increased heating rates and high thermal efficiencies.

11. A convection muffle furnace as claimed in claim 10, wherein said muffle means has its one end adjacent said front wall of the heating chamber being fixed and has its other end adjacent said rear wall thereof being freely movable.

12. A convection muffle furnace as claimed in claim 10, further comprising expansion zone means disposed adjacent the front and rear walls of said heating chamber for permitting longitudinal expansion and contraction of said muffle means.

13. A convection muffle furnace as claimed in claim 10, wherein said muffle means [includes side walls, a floor and a roof which] are corrugated so as to impart rigidity thereto.

14. A convection muffle furnace as claimed in claim 10, further comprising expansion cylinder means disposed adjacent the rear wall of the heating chamber so as to maintain a constant tension on said muffle means and thereby preventing its deformation.

15. A convection muffle furnace as claimed in claim 10, wherein said tower means are mounted in openings formed in said top wall of the heating chamber, said openings being somewhat larger than the diameter of said tower means to define spaces which permits lateral movement of said tower means relative to said top wall for absorbing expansion and contraction of said muffle *means*.

16. A convection muffle furnace as claimed in claim 15, further comprising sliding seal means disposed over said openings in said top wall to provide a gas-tight seal between said top wall and said towers.

17. A convection muffle furnace as claimed in claim 10, further comprising an entrance chamber disposed upstream of said front wall of the heating chamber for preventing contamination of the atmosphere in said muffle means as workpieces to be heat-treated are supplied.

18. A convection muffle furnace as claimed in claim 17, further comprising an exit chamber disposed downstream of said rear wall of the heating chamber for preventing contamination of the atmosphere in said muffle means as the workpieces that have been heat-treated are removed.

19. A convection muffle furnace for brazing and/or annealing a workpiece comprising:

a heating chamber formed by a bottom wall, a pair of side walls, a front wall, a rear wall and a top wall;

a *D-shaped muffle having planar side walls parallel to the side walls of the heating chamber, a planar floor connected to the planar side walls and a dome-shaped roof positioned above and connected to the planar side walls, said* muffle having at least one tower formed integrally therewith which is mounted movably relative to the top wall of said heating chamber; and a circulating fan being mounted in said at least one tower so as to move along with said muffle during its expansion and contraction.

*20. A convection muffle furnace for brazing and/or annealing a workpiece, comprising:*

*a heating chamber formed by a bottom wall, a pair of side walls, a front wall, a rear wall and a top wall;*

*D-shaped muffle means disposed inside of said heating chamber and extending longitudinally from the front wall of said heating chamber to the rear wall thereof;*

*said muffle means including tower means formed integrally therewith and being mounted movably relative to the top wall of said heating chamber;*

*a first thermocouple positioned within the muffle means and a second thermocouple positioned outside the muffle means and within the heating chamber, said first and second thermocouples providing temperature signals;*

*circulating means being mounted and sealed in said tower means for creating an atmospheric convection current; and*

*direct-fired burners for heating the exterior of said muffle means so as to increase the temperature of the atmospheric convection current,*

*whereby said circulating means in said tower means are movable along with said muffle means during its expansion and contraction so as to provide increased heating rates and high thermal efficiencies.*

*21. A convection muffle furnace for brazing and/or annealing a workpiece comprising:*

*a heating chamber formed by a bottom wall, a pair of side walls, a front wall, a rear wall and a top wall;*

*a D-shaped muffle having at least one tower formed integrally therewith which is mounted movably relative to the top wall of said heating chamber;*

*a first thermocouple positioned within the muffle and a second thermocouple positioned outside the muffle means and within the heating chamber, said first and second thermocouples providing temperature signals; and*

*a circulating fan being mounted in said at least one tower so as to move along with said muffle during its expansion and contraction.*

* * * * *